(12) United States Patent
Weiner et al.

(10) Patent No.: US 12,368,734 B2
(45) Date of Patent: Jul. 22, 2025

(54) METHOD FOR IDENTIFYING A MANIPULATION OF A MESSAGE OF A BUS SYSTEM BY MEANS OF A CONTROL DEVICE OF A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Michael Weiner, Munich (DE); Peter Winklhofer, Munich (DE); Robert Meinlschmidt, Munich (DE); Theresa Reiner, Munich (DE); Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 21 days.

(21) Appl. No.: 18/553,990

(22) PCT Filed: Feb. 15, 2022

(86) PCT No.: PCT/EP2022/053558
§ 371 (c)(1),
(2) Date: Oct. 4, 2023

(87) PCT Pub. No.: WO2022/238023
PCT Pub. Date: Nov. 17, 2022

(65) Prior Publication Data
US 2024/0195824 A1   Jun. 13, 2024

(30) Foreign Application Priority Data
May 11, 2021   (DE) .................... 10 2021 112 329.1

(51) Int. Cl.
*H04L 9/40*       (2022.01)
*H04L 67/12*      (2022.01)

(52) U.S. Cl.
CPC ........ *H04L 63/1416* (2013.01); *H04L 63/123* (2013.01); *H04L 67/12* (2013.01)

(58) Field of Classification Search
CPC .... H04L 63/1416; H04L 63/123; H04L 67/12
See application file for complete search history.

(56) References Cited

U.S. PATENT DOCUMENTS

| 2016/0134503 A1* | 5/2016 | Watson ................. H04L 43/026 709/224 |
| 2016/0233302 A1* | 8/2016 | Wu ................. H01L 21/823885 |

(Continued)

FOREIGN PATENT DOCUMENTS

| DE | 102015205670 A1 | 6/2016 |
| DE | 102017214661 A1 | 2/2019 |
| DE | 102019001978 A1 | 10/2020 |

OTHER PUBLICATIONS

International Search Report corresponding to International Patent Application No. PCT/EP2022/053558, dated Jun. 3, 2022 (4 pages).

(Continued)

*Primary Examiner* — Javier O Guzman
(74) *Attorney, Agent, or Firm* — Maginot, Moore & Beck LLP

(57) ABSTRACT

A method identifies a manipulation of a message of a bus system using a control device of a vehicle. Th method includes receiving a first message from a first control device using the control device of the vehicle. The method also includes receiving a second message from a second control device using the control device of the vehicle, and determining a system status of the vehicle based at least in part on the second message from the second control device. The method further checking a plausibility of a content of the first message using the determined system status of the vehicle using the control device of the vehicle in order to (Continued)

identify the manipulation of the first message. An alarm message is provided if the content of the first message is not plausible.

18 Claims, 2 Drawing Sheets

(56) References Cited

U.S. PATENT DOCUMENTS

| | | | | |
|---|---|---|---|---|
| 2018/0124030 A1* | 5/2018 | Bima | ...................... | H04L 63/08 |
| 2018/0262466 A1* | 9/2018 | Atad | ................... | H04L 63/0245 |
| 2018/0302422 A1* | 10/2018 | Kishikawa | ............ | H04L 9/3271 |
| 2018/0359618 A1* | 12/2018 | Antoni | ................... | G08G 1/163 |
| 2018/0375881 A1* | 12/2018 | Wada | ...................... | H04W 4/48 |
| 2019/0149561 A1* | 5/2019 | Maeda | ................ | H04L 63/1466 |
| | | | | 726/23 |
| 2019/0312892 A1* | 10/2019 | Chung | ................. | G06F 21/554 |
| 2021/0058372 A1* | 2/2021 | Katoh | .................. | B60W 50/04 |
| 2021/0320932 A1* | 10/2021 | Tsurumi | ................. | H04L 63/20 |

OTHER PUBLICATIONS

Written Opinion corresponding to International Patent Application No. PCT/EP2022/053558, dated Jun. 3, 2022 (5 pages).

German Search Report corresponding to German Patent Application No. 10 2021 112 329.1, dated Feb. 15, 2022. (7 pages).

* cited by examiner

METHOD FOR IDENTIFYING A MANIPULATION OF A MESSAGE OF A BUS SYSTEM BY MEANS OF A CONTROL DEVICE OF A VEHICLE, COMPUTER-READABLE MEDIUM, SYSTEM, AND VEHICLE

The present application is the U.S. national phase of PCT Application PCT/EP2022/053557 filed on Feb. 15, 2022, which claims priority of German patent application No. 102021112330.5 filed on May 11, 2021, which is incorporated herein by reference in its entirety.

TECHNICAL FIELD

The disclosure relates to the field of identifying a manipulation of a message of a bus system by means of a control device of a vehicle.

BACKGROUND

Control devices of vehicles are connected to one another via bus systems. Due to a manipulation of a control device, the control device can send messages in an unauthorized manner to other control devices via a bus system. A function of the receiving control device can thus be influenced in an unauthorized manner.

It is therefore an object of the invention to identify a manipulation of a message of a control device efficiently. In particular, it is an object of the invention to identify a manipulation of a content of a message by means of a control device as a receiver of the message efficiently.

SUMMARY

The above-stated objects, as well as others, are achieved by advantageous embodiments and refinements disclosed and claimed herein.

A first aspect is a method for identifying a manipulation of a message of a bus system by means of a control device of a vehicle. The method can be a computer-implemented method and/or a control device-implemented method. The bus system can be a CAN bus. The control device is preferably a receiver of the message. The method can be executed on the control device which is the receiver of the message. The vehicle can be a motor vehicle.

The method comprises receiving a first message from a first control device by means of the control device. The first control device is preferably a sender of the first message. Furthermore, the method comprises receiving a second message from a second control device by means of the control device. The second control device is preferably a sender of the second message. Furthermore, the method comprises determining a system status of the vehicle in dependence on the second message from the second control device by means of the control device and checking the plausibility of a content of the first message using the determined system status of the vehicle by means of the control device to identify the manipulation of the first message. The plausibility check of the content of the message is preferably a functional plausibility check in dependence on the system status of the vehicle. The method provides an alarm message from the first control device to a vehicle-external server if the content of the first message is not plausible.

A manipulation of the content of the message can advantageously be efficiently identified by the plausibility check of a content of a received message using a system status of a vehicle. The system status of the vehicle is in this case trustworthy information, which is defined by a large number of technical parameters of the vehicle.

According to one advantageous embodiment, the method can comprise requesting a parameter of a sensor by means of the control device, wherein the sensor is preferably integrated in the control device or the sensor is directly connected to the control device. Furthermore, the method can comprise receiving the parameter of the sensor by means of the control device of the vehicle, and checking the plausibility of the content of the first message based on the determined system status of the vehicle and the received parameter of the sensor of the control device to identify the manipulation of the first message. The content of the first message can be efficiently checked for plausibility by means of sensor data in this way.

According to a further advantageous embodiment, the method can comprise receiving a third message from a third control device by means of the control device, determining a reference value in dependence on the third message of the third control device by means of the control device, and checking the plausibility of the content of the first message based on the determined system status of the vehicle and the determined reference value by means of the control device to identify the manipulation of the first message. The content of the first message can be efficiently checked for plausibility by means of a reference value in this way.

According to a further advantageous embodiment, the method can comprise checking the plausibility of the content of the first message based on the determined system status of the vehicle, the received parameter of the sensor, and the determined reference value by means of the control device to identify the manipulation of the first message. The content of the first message can be efficiently checked for plausibility by the control device receiving the first message in this way.

According to a further advantageous embodiment, the method can comprise checking the plausibility of the determined system status of the vehicle based on the content of the first message by means of the control device to identify the manipulation of the second message of the bus system, and a provision of an alarm message from the control device to a vehicle-external server if the determined system status is not plausible. The system status can be checked for plausibility efficiently by means of the control device in this way.

A further aspect relates to a computer-readable medium for identifying a manipulation of a bus system by means of a control device of a vehicle, wherein the computer-readable medium comprises instructions which, when executed on the control device, carry out the above-described method.

A further aspect relates to a system for identifying a manipulation of a bus system by means of a control device of a vehicle, wherein the system is designed to carry out the above-described method.

A still further aspect is a vehicle comprising the above-described system for identifying a manipulation of a bus system by means of a control device of the vehicle.

Further features arise from the claims, the figures, and the description of the figures. All features and combinations of features mentioned above in the description and the features and combinations of features mentioned hereinafter in the description of the figures and/or solely shown in the figures are usable not only in the respective specified combination but also in other combinations or alone.

An embodiment is described hereinafter on the basis of the appended drawings. Further details, preferred embodiments, and refinements of the invention result therefrom.

BRIEF DESCRIPTION OF THE DRAWINGS

In detail, FIG. 1 shows an exemplary method 100 for identifying a manipulation of a message of a bus system by means of a control device of a vehicle. The control device as a receiver of a message can identify whether the message was manipulated by the sending control device or a control device interconnected on the bus system.

Figure 1:
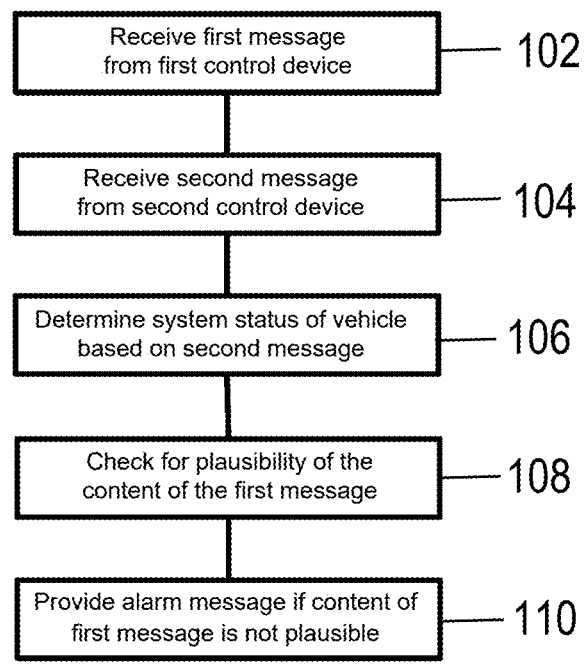
FIG. 1 shows an exemplary method for identifying a manipulation of a message of a bus system by means of a control device of a vehicle.

The method 100 includes receiving 102 a first message from a first control device by means of the control device. For example, the first message can contain a current vehicle speed. Furthermore, the method 100 includes receiving 104 a second message from a second control device by means of the control device. For example, the second message can comprise a switching-on status of a drive of the vehicle, an output speed of a transmission of the vehicle, a transmission gear ratio, and/or an engine speed.

The method 100 can determine 106 a system status of the vehicle in dependence on the second message from the second control device by means of the control device. For example, the method can determine using the switching-on status of the drive of the vehicle, the output speed of the transmission of the vehicle, the transmission gear ratio, and/or the engine speed whether the vehicle is in the system status driving, residing, or parking.

Additionally or alternatively, the method can request a parameter of a sensor integrated in the control device or a sensor directly connected to the control device. If the sensor is a GPS sensor, the control device can, for example, request a GPS speed from the sensor.

Additionally or alternatively, the method can receive a reference value by means of a third message from a third control device. The reference value can comprise a vehicle speed of the third control device.

The method 100 can check for plausibility 108 a content of the first message using the determined system status by means of the control device, in order to identify the manipulation of the first message. If the determined system status is parking, for example, and the content of the first message is a vehicle speed>0 km/h, the control device can identify a manipulation of the content of the first message. In the system status parking, a speed>0 km/h is impermissible.

Finally, the method 100 can provide 110 an alarm message from the control device to a vehicle-external server if the content of the first message is not plausible.

The method can advantageously perform a functional plausibility check of the content of a received message. Proceeding from a system status which is assumed to be trustworthy, the method can check whether the content of the received message is possible in the determined system status. If the content of the received message is impermissible with the system status, the control device can identify a manipulation. To further increase the reliability and/or the security of the manipulation identification, the method 100 can use a reference value and/or a sensor value to check the plausibility of the content of the received message.

Figure 2:
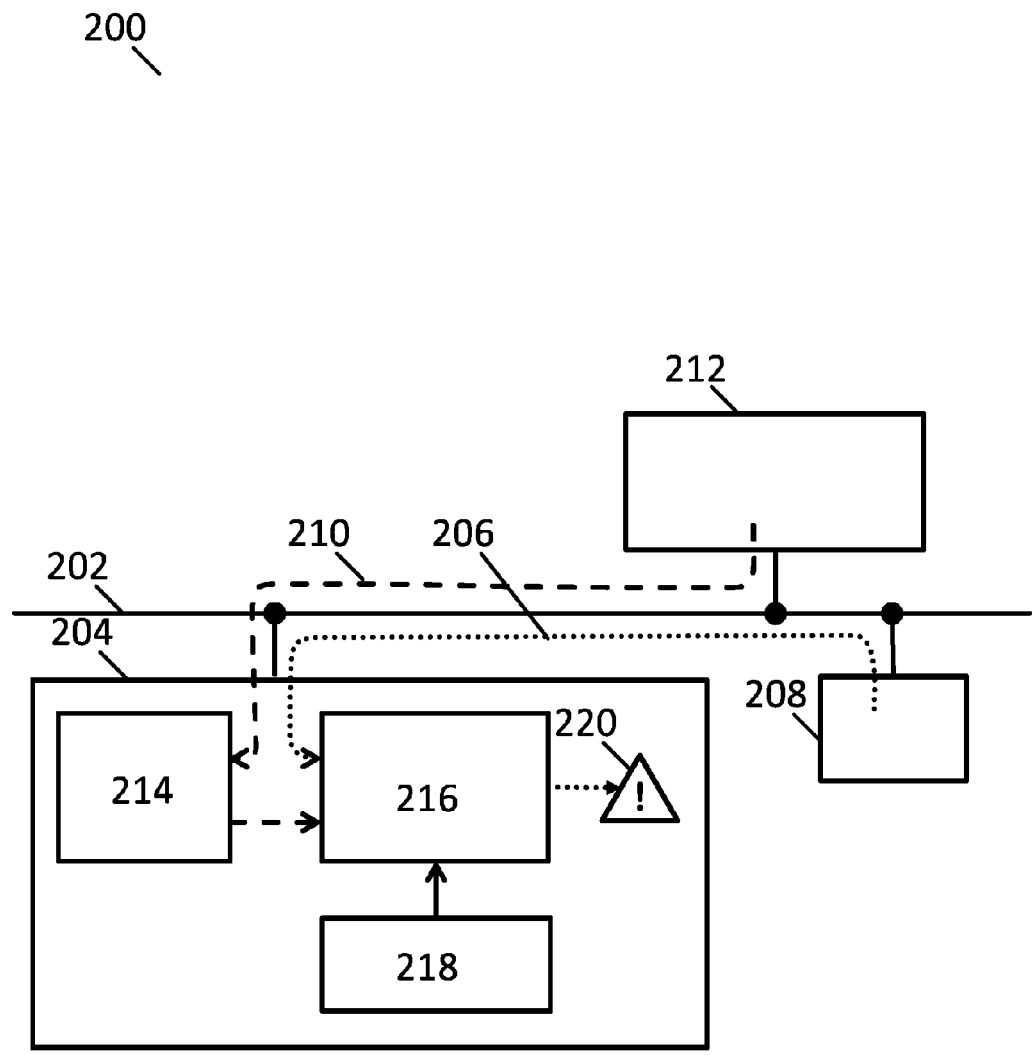
FIG. 2 shows an exemplary system for identifying a manipulation of a message of a bus system by means of a control device of a vehicle.

In detail, FIG. 2 shows an exemplary system 200 for identifying a manipulation of a message of a bus system 202 by means of a control device 204 of a vehicle. The control device 204 can receive a first message 206 from a first control device 208 and can receive a second message 210 from a second control device 212. Furthermore, the control device 204 can determine a system status 214 of the vehicle in dependence on the second message 210 from the second control device 212. The control device 204 can comprise a plausibility check component 216, which checks for plausibility a content of the first message 206 using the determined system status of the vehicle in order to identify of the manipulation first message. Additionally 4 alternatively, the plausibility check component 216 can use a parameter of a sensor 218 for the plausibility check of the content of the first message 206. If the content of the first message 206 is not plausible, the control device 204 can transmit an alarm message 220 to a vehicle-external server (not shown in FIG. 2).

LIST OF REFERENCE NUMERALS 100 method
102 receiving a first message
104 receiving a second message
106 determining a system status
108 checking plausibility of a content of the first message
110 providing an alarm message
200 system
202 bus system
204 control device
206 first message
208 first control device
210 second message
212 second control device
214 system status
216 plausibility check component
218 sensor
220 alarm message

The invention claimed is:

1. A method for identifying a manipulation of a message of a bus system using a control device of a vehicle, the method comprising:
receiving a first message from a first control device using the control device of the vehicle;
receiving a second message from a second control device using the control device of the vehicle;
determining a system status of the vehicle based at least in part on the second message from the second control device using the control device of the vehicle;
checking a plausibility of a content of the first message using the determined system status of the vehicle using the control device of the vehicle in order to identify the manipulation of the first message;
requesting a parameter of a sensor using the control device of the vehicle, wherein the sensor is integrated in the control device of the vehicle or the sensor is directly connected to the control device of the vehicle;
receiving the parameter of the sensor using the control device of the vehicle; and
checking the plausibility of the content of the first message further based on the received parameter of the sensor of the control device of the vehicle in order to identify the manipulation of the first message;
receiving a third message from a third control device using the control device of the vehicle;

determining a reference value in dependence on the third message of the third control device by means of the control device of the vehicle; and checking the plausibility of the content of the first message further based on the determined reference value; and providing an alarm message from the control device of the vehicle to a server external to the vehicle if the content of the first message is not plausible.

2. The method as claimed in claim 1, further comprising:

checking the plausibility of the determined system status of the vehicle based on the content of the first message using the control device of the vehicle in order to identify the manipulation of the second message of the bus system; and providing an alarm message from the control device of the vehicle to a server that is external to the vehicle if the determined system status is not plausible.

3. The method of claim 2, wherein the determined system status is at least one of the group consisting of: a switching-on status of a drive of the vehicle, an output speed of a transmission of the vehicle, a transmission gear ratio, and an engine speed.

4. The method of claim 1, wherein the determined system status is an engine speed.

5. The method of claim 1, wherein the determined system status is at least one of the group consisting of: a driving status and a parked status.

6. The method of claim 2, wherein the determined system status is at least one of the group consisting of: a driving status and a parked status.

7. The method of claim 1 wherein the determined system status is one of driving, residing, or parking.

8. The method of claim 7 wherein the sensor is a speed sensor provided by a GPS sensor.

9. The method of claim 8 wherein the reference value is a vehicle speed provided by the third control device.

10. A non-transitory computer-readable medium for identifying a manipulation of a bus system using a control device of a vehicle, wherein the computer-readable medium comprises instructions which, when executed on the control device of the vehicle, cause the vehicle to:

receive a first message from a first control device using the control device of the vehicle;

receive a second message from a second control device using the control device of the vehicle;

determine a system status of the vehicle based at least in part on the second message from the second control device using the control device of the vehicle;

check a plausibility of a content of the first message using the determined system status of the vehicle using the control device of the vehicle in order to identify the manipulation of the first message;

request a parameter of a sensor using the control device of the vehicle, wherein the sensor is integrated in the control device of the vehicle or the sensor is directly connected to the control device of the vehicle;

receive the parameter of the sensor using the control device of the vehicle; and check the plausibility of the content of the first message further based on the received parameter of the sensor of the control device of the vehicle in order to identify the manipulation of the first message;

receive a third message from a third control device using the control device of the vehicle;

determine a reference value in dependence on the third message of the third control device by means of the control device of the vehicle; and check the plausibility of the content of the first message further based on the determined reference value; and provide an alarm message from the control device of the vehicle to a server external to the vehicle if the content of the first message is not plausible.

11. The non-transitory computer-readable medium of claim 10 further comprising instructions which, when executed on the control device of the vehicle, cause the vehicle to:

check the plausibility of the determined system status of the vehicle based on the content of the first message in order to identify the manipulation of the second message of the bus system; and provide an alarm message to a server that is external to the vehicle when the determined system status is not plausible.

12. The non-transitory computer-readable medium of claim 11 wherein the determined system status is at least one of the group consisting of: a switching-on status of a drive of the vehicle, an output speed of a transmission of the vehicle, a transmission gear ratio, and an engine speed.

13. The non-transitory computer-readable medium of claim 11 wherein the determined system status is at least one of the group consisting of: a driving status and a parked status.

14. A vehicle comprising:

a bus system;

a first control device connected to the bus system;

a second control device connected to the bus system; and a vehicle control device connected to the bus system, the vehicle control device including a sensor connected to a sensor and a plausibility check component, the vehicle control device configured to:

receive a first message from the first control device;

receive a second message from the second control device;

determine a system status of the vehicle based at least in part on the second message from the second control device;

check a plausibility of a content of the first message using the determined system status of the vehicle in order to identify the manipulation of the first message;

request a parameter of the sensor;

receive the parameter of the sensor;

check the plausibility of the content of the first message further based on the received parameter of the sensor in order to identify the manipulation of the first message;

receive a third message from the third control device using the control device of the vehicle;

determine a reference value in dependence on the third message of the third control device; and check the plausibility of the content of the first message further based on the determined reference value; and provide an alarm message from the vehicle control device to a server external to the vehicle when the content of the first message is not plausible.

15. The vehicle of claim 14 wherein the sensor is integrated into the vehicle control device.

16. The vehicle of claim 14 wherein the vehicle control device is further configured to:

check the plausibility of the determined system status of the vehicle based on the content of the first message in order to identify the manipulation of the second message of the bus system; and provide an alarm message to a server that is external to the vehicle when the determined system status is not plausible.

17. The vehicle of claim 14 wherein the determined system status is at least one of the group consisting of: a switching-on status of a drive of the vehicle, an output speed of a transmission of the vehicle, a transmission gear ratio, and an engine speed.

18. The vehicle of claim 14 wherein the determined system status is at least one of the group consisting of: a driving status and a parked status.

* * * * *